(12) United States Patent
Horspool et al.

(10) Patent No.: US 11,586,734 B2
(45) Date of Patent: Feb. 21, 2023

(54) SYSTEMS AND METHODS FOR PROTECTING SSDS AGAINST THREATS

(71) Applicant: Kioxia Corporation, Tokyo (JP)

(72) Inventors: Nigel Horspool, Prestwood (GB); Gary James Calder, Eastleigh (GB)

(73) Assignee: KIOXIA CORPORATION, Tokyo (JP)

( * ) Notice: Subject to any disclaimer, the term of this patent is extended or adjusted under 35 U.S.C. 154(b) by 158 days.

(21) Appl. No.: 16/805,671

(22) Filed: Feb. 28, 2020

(65) Prior Publication Data

US 2021/0271757 A1 Sep. 2, 2021

(51) Int. Cl.
*G06F 21/56* (2013.01)
*G06F 21/55* (2013.01)
*G06F 21/00* (2013.01)

(52) U.S. Cl.
CPC .......... *G06F 21/566* (2013.01); *G06F 21/554* (2013.01); *G06F 21/567* (2013.01); *G06F 2221/033* (2013.01)

(58) Field of Classification Search
CPC .... G06F 21/566; G06F 21/554; G06F 21/567; G06F 21/50; G06F 21/55; G06F 21/552; G06F 21/56; G06F 21/57; G06F 2221/033
See application file for complete search history.

(56) References Cited

U.S. PATENT DOCUMENTS

| 9,275,065 | B1 | 3/2016 | Ganesh et al. |
| 10,970,395 | B1* | 4/2021 | Bansal ................... G06F 21/554 |
| 11,170,104 | B1* | 11/2021 | Stickle ................... G06N 20/00 |
| 2010/0287383 | A1* | 11/2010 | Conte ..................... G06F 21/78 713/189 |
| 2015/0333866 | A1* | 11/2015 | Astigarraga ........ G06F 11/0754 714/708 |
| 2018/0364917 | A1 | 12/2018 | Ki et al. |
| 2019/0042781 | A1 | 2/2019 | Lukacs et al. |

OTHER PUBLICATIONS

Foreign Search Report on PCT PCT/IB2021/051211 dated May 11, 2021; 3 pages.

* cited by examiner

*Primary Examiner* — Edward Zee
(74) *Attorney, Agent, or Firm* — Foley & Lardner LLP

(57) ABSTRACT

Various implementations described herein relate to systems and methods for protecting data stored on a Solid State Drive (SSD) against malware, including determining, by a controller of the SSD, a typical traffic profile, receiving, by the controller, commands from a host, and determining, by the controller, that the commands are likely caused by malware by determining that the commands deviate from the typical traffic profile. In response to determining the commands are likely caused by the malware, the controller performs a malware response action.

20 Claims, 5 Drawing Sheets

SYSTEMS AND METHODS FOR PROTECTING SSDS AGAINST THREATS

TECHNICAL FIELD

The present disclosure generally relates to protecting solid state drives (SSDs) against threats, and particularly, to systems and methods for protecting SSDs from malware such as ransomware.

BACKGROUND

Malware (e.g., ransomware) attacks cause damage to user data stored on Solid State Drives (SSDs), for example, in a datacenter setting, and temporarily or permanently denying users access to the user data. A user operating a host is authenticated prior to using the datacenter to store data. Once authenticated, the data stored in the SSDs of the datacenter can typically be freely accessed by the host without further authentication or security measures, where the host's actions relative to the SSDs can be manipulated by the malware. Thus, authentication protects the data only with respect to the SSDs being in an unauthenticated state and requiring authentication to gain access, such as when being powered off and on again.

Conventional methods to guard against malware include static detection of executable files. Static detection relates to analyzing the files before the files are executed. However, the malware can employ code obfuscation, binary packing, self-modification, encrypted code, and other techniques to avoid static detection.

Another conventional method to guard against malware is automatic analysis of malware, which involves monitoring filesystem input/output (I/O) activities in a host and detecting malware using a distinctive I/O pattern or "fingerprint." However, such analysis is performed only in an artificial virtual sandbox environment and not a real live system.

A further conventional method uses machine learning to execute and monitor malware within a sandbox environment. In this method, behaviors of malware is logged as sequential reports of a so-called malware instruction set (MIST). These reports are converted into "instruction q-grams," which are embedded into a multidimensional vector space. Based on these reports, machine learning techniques are applied to perform clustering and classification of the behaviors of the malware. However, the memory and compute requirements (e.g., 5 GB and a quad-core Opteron at 2.4 GHz) make this method infeasible for deployment on an SSD controller. In addition, this method would not react quickly enough to prevent malware from running its task to completion and therefore be useless in a live environment.

SUMMARY

In certain aspects, a method for protecting data stored on a SSD against malware, includes determining, by a controller of the SSD, a typical traffic profile, receiving, by the controller, commands from a host, determining, by the controller, that the commands are likely caused by malware by determining that the commands deviate from the typical traffic profile, and in response to determining the commands are likely caused by the malware, perform, by the controller, a malware response action.

The present implementations of a SSD device includes a controller and a non-volatile memory. The controller determines a typical traffic profile, receives commands from a host, determines that the commands are likely caused by malware by determining that the commands deviate from the typical traffic profile, and in response to determining the commands are likely caused by the malware, performs a malware response action.

In some implementations, a non-transitory computer-readable medium storing computer-readable instructions, such that when executed, causes a controller of an SSD to determine a typical traffic profile, receive commands from a host, determine that the commands are likely caused by malware by determining that the commands deviate from the typical traffic profile, and in response to determining the commands are likely caused by the malware, performing a malware response action.

DETAILED DESCRIPTION

Figure 1:
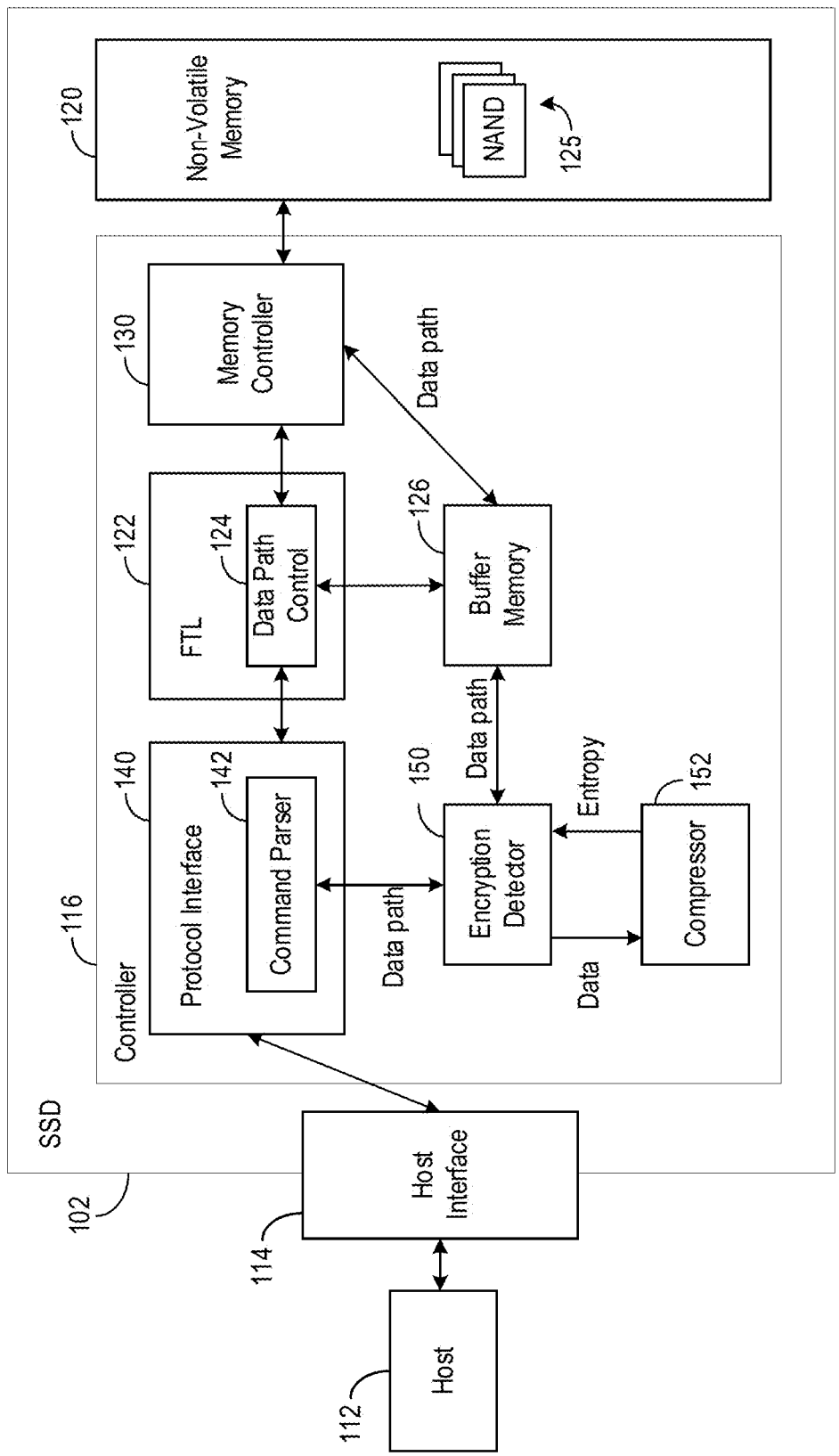
FIG. 1 is a block diagram showing an example SSD operatively coupled to a host, according to some implementations.

The present disclosure relates to systems, methods, and non-transitory processor-readable media for protecting user data stored on SSDs against external threats such as but not limited to, malware. Malware refers to any software or applications designed to corrupt, erase, destroy, or encrypt, without authorization, user data stored on the SSDs. Examples of malware include viruses, ransomware, and so on. The malware typically runs on a system of the host (e.g., a storage server), and instructs the SSDs operatively coupled to the host to encrypt user data (then erasing the original plaintext of the user data) of the host. For example, malware running on a host can target data (e.g., files) of a filesystem by using filesystem calls. In another example, malware can use lower-level commands, e.g., block-level commands such as but not limited to, block erase, trim/unmap/deallocate, and so on.

Conventional methods to protect user data from malware running on the host are unsuitable for in-storage disk-based deployment. That is, the conventional methods are not implemented on firmware of SSDs and are unfit to be implemented on the firmware of the SSDs. On the other hand, the arrangements disclosed herein allow transparent detection (e.g., without noticeable performance degradation) of ransomware from within the storage device (e.g., the SSD). The ransomware running on the host is unable to detect such processes running within the firmware of the SSD, or impede or otherwise prevent the processes from running. Furthermore, the arrangements disclosed herein provides an additional layer of protection against malware, in case that the conventional methods implemented on the host fails to detect the malware.

In a datacenter including SSDs, I/O command patterns, data sizes, and data content types for each SSD may be similar every day for a particular datacenter environment. That is, different datacenter environments have different traffic types and different traffic profiles. In one example, a host such as a microblogging and social networking service stores data having small data sizes (corresponding to blog entries or social media post) in the SSDs by sending a significant number of write commands with small data ranges to the SSDs for the data, where such data is infrequently updated but frequently read. In another example, a host such as an online audio/multimedia provider stores data having large data sizes (corresponding to video and/or audio data), where the data content type of the data is encoded data. The online multimedia provider typically sends a relatively small number of sequential write commands with large data ranges/extents to the SSDs for the data (e.g. to initially store the multimedia files), where such data is also subject to a significant number of sequential read commands (e.g. by large numbers of users streaming the multimedia files).

Ransomware typically selects and targets user data files in preference to operating system or program files, encrypting the user files and overwriting/deleting the original plaintext user files as quickly as possible, thus rendering the user files inaccessible until one or more decryption keys to decrypt the files are provided, after a ransom has been paid. In one example, ransomware first reads a file from a storage drive in which the file is stored, encrypts the file in the server (e.g., the host) using a cryptographically strong symmetric encryption algorithm such as but not limited to, Advanced Encryption Standard (AES), and then writes the file back to the storage drive in the encrypted form. Thus, ransomware overwrites and deletes the original file in plaintext and replaces it with an encrypted copy. Such processes may repeat for all files in particular folders or directories identified by the ransomware as containing user files. In some cases, ransomware encrypts particular types of files known to contain user data, such as but not limited to, text files, documents, images, photographs files, video files, and so on, while other types of files such as but not limited to, executables and temporary files, are not.

While overwriting a file usually results in data corresponding to the file that is stored in the physical storage media (e.g., a hard drive) being overwritten, this is untrue for an SSD implemented using typical NAND flash memory. Given that NAND flash memory pages (in a memory block) may not be overwritten without first erasing the entire block including other pages, overwriting to files of a host is handled by the SSD controller (instead of the host), which writes encrypted data corresponding to the new file contents to new memory pages while the original, plaintext data corresponding to the original file contents remain in its original memory pages. The data corresponding to the original file contents remain in its original memory pages until the controller performs a garbage collection operation and erases data in the memory blocks, including data in the original memory pages. Accordingly, even as the ransomware writes the new file contents instead of overwriting the original file contents and then instructs the filesystem to delete the original file contents, the original file contents are not overwritten in the NAND flash memory of the SSD. Instead, the filesystem metadata is changed to indicate that the original file contents have been deleted. In that regard, the damage of the malware can easily be reversed using undelete operations, or the original file contents can be recovered using specialist software.

To address this, ransomware may instead write the encrypted data as new files in the SSD and issue trim/unmap/deallocate commands with respect to the physical memory locations (e.g., blocks containing the original memory pages) in which the original, plaintext data is located. In response to receiving the trim/unmap/deallocate commands, the SSD controller identifies as candidates for garbage collection the physical memory locations in which the original, plaintext data is located, causing the blocks containing the original memory pages to be permanently erased. However, typically the garbage collection process itself may not happen immediately and may take place in response to determining that free memory space in the non-volatile memory of the SSD runs low or in response to determining that normal host read/write activity subsides, enabling the SSD controller to perform garbage collection without impacting host read/write I/O performance. This delay affords opportunity for the SSD controller to detect abnormal trim/unmap/deallocate command activities and take preventative action such as suspending garbage collection and/or suspending processing of trim/unmap/deallocate commands.

In some arrangements, firmware running an SSD (e.g., a controller thereof) determines typical (e.g., normal or regular) traffic profile, including but not limited to, typical filesystem I/O command patterns, random or sequential read/write transfer types, typical data transfer rates and typical data sizes, time of day of transfers, and typical data content types within the context of a particular datacenter environment. The controller can stop, delay, and/or alert in response to detecting abnormalities such as one or more of unusual I/O command patterns, unusual logical block address range sizes, data transfer types, data rates or data sizes, or unusual data content types. In other words, the controller can detect I/O command patterns, data sizes, or data content types that deviate from the typical I/O command patterns, the typical data logical block address range sizes, transfer types, rates, sizes, or the typical data content types, respectively. The abnormalities may be results of operations by malware.

For example, commands to write files containing the data content type of encrypted data and having a large data size may be due to the operations of ransomware within a particular datacenter environment in which writing of large data files containing encrypted data is atypical.

In some arrangements, machine learning and artificial intelligence (AI) can be deployed in the SSD firmware to learn typical filesystem I/O command patterns, logical block address range sizes, data transfer types, rates, sizes, and data content types, to determine the typical traffic profile. Based on this learning, any unusual I/O command patterns, logical block address range sizes, data transfer types, rates, sizes, and data content types that deviate from the typical activities result in changes to the typical responses to commands associated with the unusual I/O command patterns, logical block address range sizes, data transfer types, rates, sizes, and data content types.

FIG. 1 shows a block diagram that schematically illustrates a structure of an SSD 102, in accordance with some implementations. The SSD 102 is operatively coupled to a host 112. The host 112 (e.g., a host device such as a server) connects to the SSD 102 (e.g., a controller 116) via a host interface 114, which conforms to a storage interface standard. The SSD 102 functions as an internal or external storage device of the host 112, in some examples. Examples of the communication interface standard implemented for the host interface 114 include standards such as but not limited to, Serial Advanced Technology Attachment (SATA), Serial Attached SCSI (SAS), Peripheral Components Interconnect Express (PCIe), and so on.

Examples of the host 112 include a server providing virtualized desktop systems and using SSDs including the SSD 102 to store data in connection with the provision of virtualized desktop systems. Examples of the host 112 further include a server providing a social media application using SSDs including the SSD 102 to store data corresponding to social media posts. In addition, examples of the host 112 can include a server providing media contents using SSDs including the SSD 102 to store audio/multimedia data (corresponding to video and/or audio data).

The SSD 102 includes a controller 116 and a non-volatile memory (e.g., a flash memory) 120. The controller 116 includes a protocol interface 140, a flash translation layer (FTL) 122, a memory controller 130, an encryption detector 150, and a compressor 152.

The controller 116 performs (executes) data transfer control on the SSD 102. The controller 116 controls a buffer memory 126 to temporarily store data transferred from the host 112, before the data is written to the dies of the NAND memory devices 125. Therefore, the buffer memory 126 functions as a data cache memory for the non-volatile memory 120, and can be one or more of a Random Access Memory (RAM), Dynamic Random Access Memory (DRAM), Ferroelectric Random Access Memory (FeRAM), Magnetoresistive Random Access Memory (MRAM), and so on. The buffer memory 126 may be implemented as part of the controller 116 (as shown), or may be external to the controller 116 (implemented using hardware different from that on which the controller 116 is implemented) while still within the SSD 102. A processor (not shown) of the controller 116 executes boot code in a Read-Only Memory (ROM), transferring control to FTL firmware running in a Static Random Access Memory (SRAM) to manage the interchange of data between the host interface 114 and the memory controller 130 via the volatile storage.

The memory controller 130 can include one or more non-volatile memory channel controllers (not shown). The non-volatile memory 120 includes one or more non-volatile (non-transitory) NAND memory devices 125, each of which may be composed of multiple banks of die coupled to the memory controller 130 by a flash memory bus such as a memory channel. The NAND memory devices 125 are configured to store data. The channel controllers includes scheduler logic (e.g., a scheduler) that controls scheduling of memory commands/operations (e.g., write commands, read commands, garbage collection, trim/unmap/deallocate commands, and so on) issued to the NAND memory devices 125.

The protocol interface 140 includes a command parser 142 that receives commands (e.g., write commands, read commands, trim/unmap/deallocate commands, and so on) from the host 112 via the host interface 114 and data associated thereof, and processes the commands with respect to the associated data. For example, the command parser 142 parses the commands received from the host interface 114 and provides the data and the parsed commands to the FTL 112. The FTL 112 can perform logic-to-physical (L2P) translation that translates logical block addresses (LBAs) in the parsed commands into physical addresses on the NAND memory devices 125, as needed. The data is provided to the memory controller 130 via a data path, through the encryption detector 150 and buffer memory 126, under the control and direction of the data path control 124 (e.g., the data path may be a physical or virtual/software channel or bus) of the FTL 122. Data may be buffered temporarily in the buffer memory 126 as part of its passage through the data path. The memory controller 130 performs the operations corresponding to the commands in the non-volatile memory 120.

The FTL 114 (e.g., a FTL interface module, a FTL processor, and so on) can process an address mapping table (e.g., a L2P mapping table). The address mapping table is a mapping table that keeps records of the correspondence between LBAs and physical addresses. For example, the address mapping table can translate read and write commands (received from the host 112) in connection with LBAs into low-level commands that reference physical blocks using physical addresses. In some examples, a read or write command received from the host 112 includes at least an LBA. The LBA is a logical address that identifies a logical block, which may be a region in a sector. In some examples, the write command can also include a number of regions/sectors to which the data is to be written. The address mapping table stores mapping between each logical address and one or more physical addresses (e.g., pages of a memory die) where data of the logical address is stored.

The encryption detector 150 is configured by the data path control 124 to receive data written by the host 112 via the protocol interface 140 and send the data to memory buffer 126 to be temporarily buffered and to provide the data simultaneously to the compressor 152. The encryption detector 150 is configured to determine whether the data is encrypted data based, at least in part, on an estimated entropy value received from the compressor 152. The encryption detector 150 can further instruct the command parser 142 to perform malware response action (e.g., to halt processing or parsing of one or more or all commands received form the host 112), in the manner described. The encryption detector 150 may also communicate directly with the FTL 122 to instruct the FTL 122 to suspend any garbage collection activity as part of the malware response action.

The compressor 152 includes suitable hardware that provides inline hardware-based real-time compression of incoming data (e.g., the data provided by the encryption detector 150) that is being written by the memory controller 130. Encrypted data exhibits a high entropy value and therefore appears to be random data and therefore incompressible by the compressor 152. Since compression and encryption of data both increase the entropy value of the data, the encryption detector 150 may include a discriminator (not shown) that can distinguish between data that is compressed and data that is encrypted. The discriminator may detect small variations in entropy characteristics of compressed data, or may use tests of randomness, including, but not limited to, Chi-squared distribution and Monte Carlo pi approximation tests. A large variation from a Chi-squared distribution or large errors in pi approximation are indicators of compressed data.

The controller 116 can be implemented on one or more suitable processing circuits having suitable processors and memory devices as a System On a Chip (SoC). Two or more of the components 140, 122, 130, 150, 152 can be provided on a same processing circuit. In some examples, the encryption detector 150 and the compressor 152 are implemented in hardware (e.g., a dedicated logic processing circuit, which may also have its own processor and memory) separate from that on which the rest of the controller 116 is implemented, but part of the same SoC, to provide real-time capability to determine an entropy value and to determine whether the data received from the host 112 is encrypted based on such entropy value, simultaneously with the processing of the data (e.g., writing of the data) by the memory controller 130.

The data path control 124 of the FTL 122 directs the flow of data through the encryption detector 150 and the buffer memory 126 to the memory controller 130, to allow processing of the data in real time without incurring additional delay. In some examples, the encryption detector 150 and the compressor 152 are implemented on the same hardware (e.g., a same logic processing circuit having a processor and a memory). In other examples, the encryption detector 150 and the compressor 152 are implemented on separate hardware within the controller 116 or external to the controller 116 (e.g., separate logic processing circuits, where each may have a processor and a memory).

An increasingly popular class of malware is ransomware, which encrypts the files of the host 112 and demands payment of a ransom for release of a decryption key to regain access to the files by decrypting using the decryption key. Typically, ransomware reads a file from the storage drive (e.g., the SSD 102), encrypts the file in the host 112 using a cryptographically strong symmetric encryption algorithm such as but not limited to, Advanced Encryption Standard (AES), then writes the file back to the SSD 102 in its encrypted form. Accordingly, ransomware overwrites and deletes the plaintext data original stored in the non-volatile memory 120. Such process is repeated for all files in particular folders or directories of the filesystem of the host 112 that the ransomware has previously identified to contain user files. In addition, ransomware frequently targets particular types of files known to contain user data, such as but not limited to, text files, documents, images, photographs, and video files, and other types of files (e.g., executables and temporary files) are not.

While overwriting a file results in the data stored in the physical storage media being overwritten in a hard drive, this is untrue for the SSD 102 which is implemented using the NAND memory devices 125. The NAND flash memory pages in a memory block may not be overwritten without first erasing an entire block containing the pages. This means overwriting the files of the host 112 is handled by the controller 116 which writes data corresponding to the new file contents to new memory pages, and data corresponding to the original file contents remain in its original physical locations (e.g., the original physical addresses identifying the original memory pages) at least until the controller 116 eventually performs a garbage collection operation and erases the memory blocks containing the original memory pages. With respect to the operations of ransomware, the original file contents correspond to the original, unencrypted (plaintext), data, which the ransomware intends to erase as quickly as possible. Even if the ransomware writes data corresponding to the new file contents (without at the same time overwriting the original file contents) and then instructs the filesystem of the host 112 to cause deletion of the original file contents, the original file contents are not overwritten. Instead, the filesystem metadata is changed to indicate the original file contents is deleted (without actually removing the original data corresponding thereto until the next garbage collection), which is a process that can easily be reversed using undelete operations or the original file contents can easily be recovered using specialist software.

Therefore, in some cases, ransomware instead may write the encrypted data as new files in the SSD 102 and issue commands (e.g., trim, unmap, or deallocate commands depending on system) that identify logical blocks in a filesystem of the host 112 that are no longer needed and may cause the controller 116 to trigger garbage collection. Such commands cause the controller 116 to more quickly identify as candidates for garbage collection the physical memory locations occupied by the original, unencrypted data, thus causing the memory blocks containing those locations (e.g., those pages corresponding to the logical blocks) to be erased. However, while the locations containing the original, unencrypted data may be identified more rapidly as candidates for garbage collection, typically the garbage collection process itself may not happen immediately and may take place when free memory space in the non-volatile memory 120 of the SSD 102 runs low or when normal host read/write activity subsides, enabling the controller 116 to perform garbage collection without impacting host read/write I/O performance. This delay affords an opportunity for the controller 102 to detect abnormal trim/unmap/deallocate command activities and take preventative action, such as suspending garbage collection and/or suspending processing of trim/unmap/deallocate commands. Trim/unmap/deallocate command activities may be determined to be abnormal if the rate of such commands (number of command operations per second, I/O operations per second or IOPS) or the size of logical address ranges specified in such commands exceeds a threshold.

Figure 2:
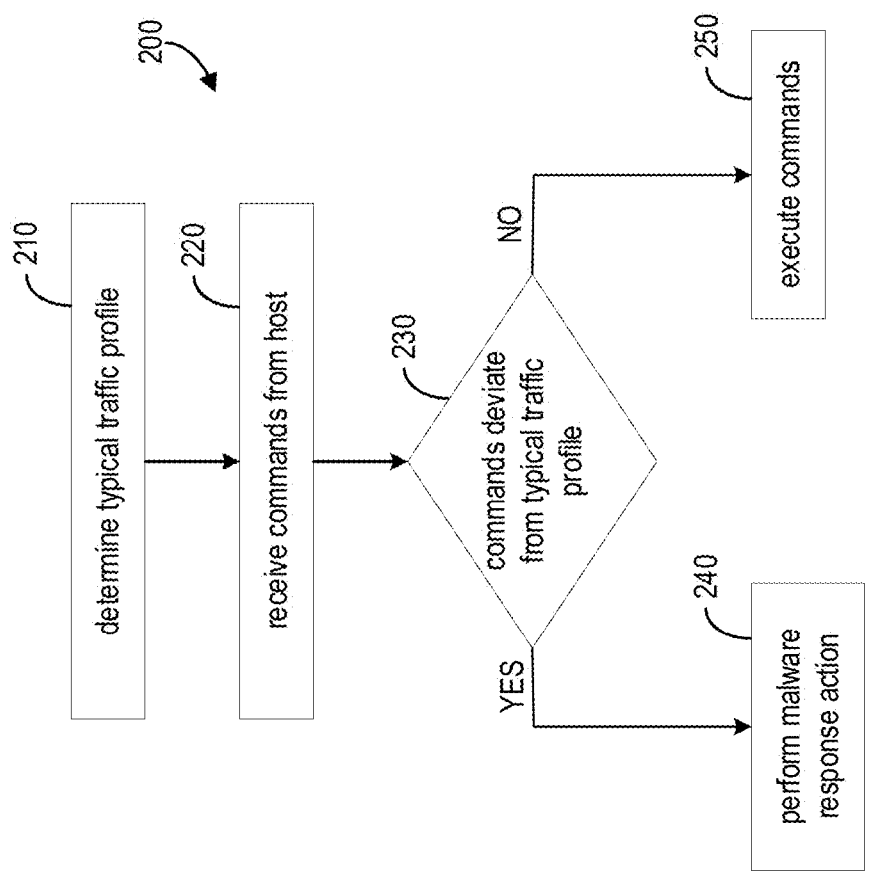
FIG. 2 is a flow diagram illustrating an example process for protecting data stored on an SSD against malware, according to some implementations.

FIG. 2 is a flow diagram illustrating an example process 200 for protecting data stored on the SSD 102 (FIG. 1) against malware (e.g., ransomware), according to some implementations. Referring to FIGS. 1-2, the process 200 is performed by the controller 116.

At 210, the controller 116 determines a typical traffic profile corresponding to the I/O operations performed by the SSD 102. The typical traffic profile includes and is determined based on one or more of I/O commands (or an I/O command pattern thereof), logical block address range sizes, data transfer types, rates and sizes of the data received from the host 112, or data content types of the data received from the host 112. In one example (e.g., FIG. 3), the typical traffic profile includes and is determined based on at least I/O Operations Per Second (IOPS) for one or more of sequential write operations, random write operations, sequential read operations, or random read operations. In another example (e.g., FIG. 4), the typical traffic profile includes and is determined based on IOPS for one or more of small write operations, large write operations, small read operations, or large read operations. In yet another example, the typical traffic profile includes and is determined based on IOPS for write operations involving encrypted data or a data size for encrypted data associated with write operations. In a further example, the typical traffic profile includes and is determined based on the size of data ranges specified in trim/unmap/deallocate operations in addition to read/write operations. In all these examples, the time of day at which the operations are conducted may also be included as part of the typical traffic profile.

At 220, the controller 116 receives one or more commands from the host 112. The commands received at 220 are different from the commands based on which the typical traffic profile is determined. The one or more commands can include a single command (e.g., in the example in which the data associated with that command includes encrypted data) or multiple commands received within a time duration.

At 230, the controller 116 determines whether the commands are likely caused by malware by determining whether the commands deviate from the typical traffic profile. In response to determining that the commands do not deviate from the typical traffic profile (e.g., in response to determining the commands are not likely caused by the malware, 230: NO), the controller 116 (e.g., the memory controller 130) executes the commands. For example, the memory controller 130 can perform read or write operations corresponding to the read or write commands received form the host 112 in connection with the non-volatile memory 120.

In response to determining that the commands deviate from the typical traffic profile (e.g., in response to determining the commands are likely caused by the malware, 230: YES), the controller 116 performs a malware response action. The malware response action includes one or more of delaying execution of the commands, stopping the execution of the commands, ignoring the commands, reporting to the host 112 that the commands are likely caused by the malware, among other suitable actions. The malware response action may also include the delaying or suspension of performing any garbage collection processes, in order to prevent the loss of original user data that may have been attempted to be overwritten or erased using trim/unmap/deallocate commands.

Figure 3:
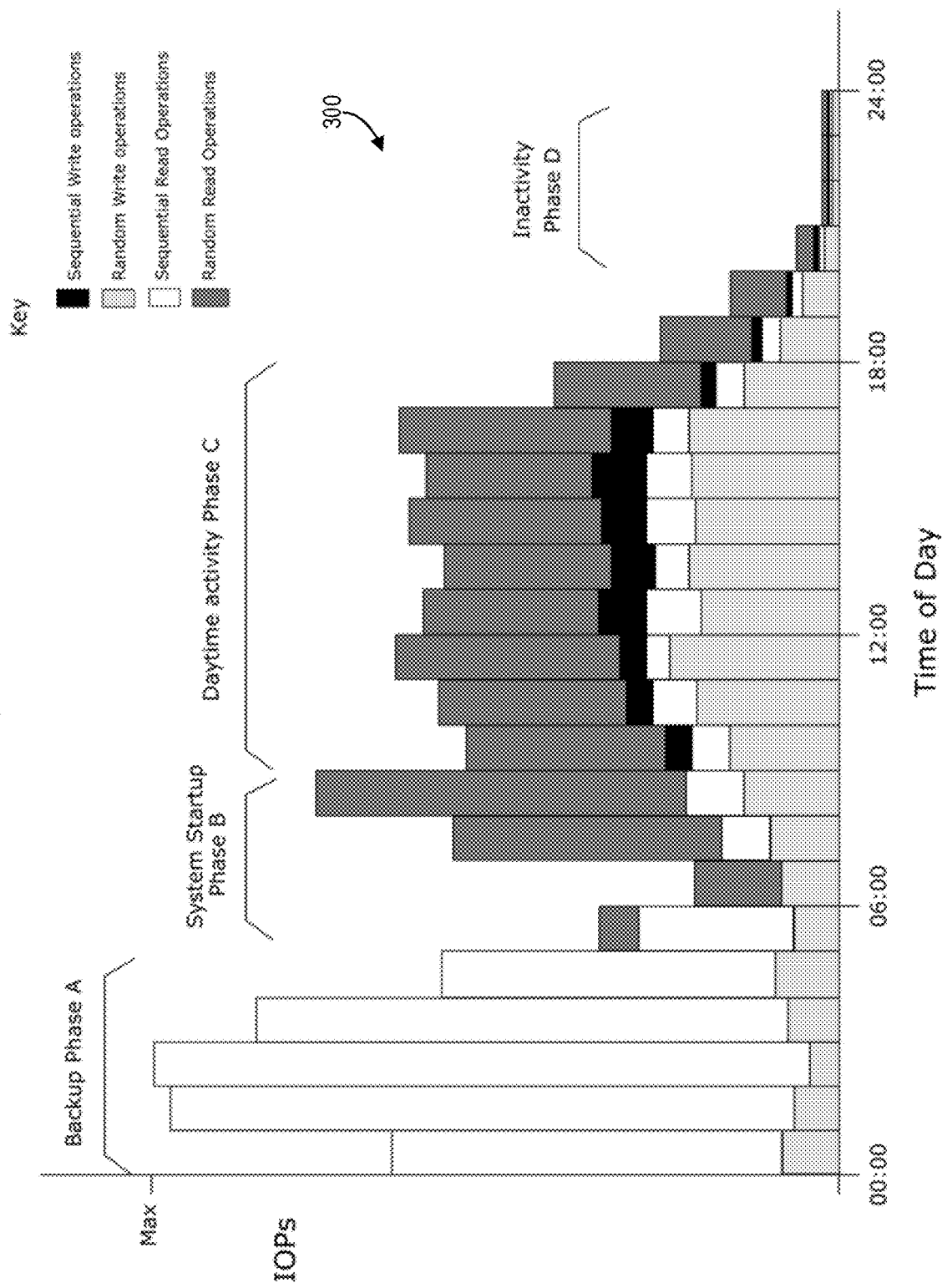
FIG. 3 is a diagram illustrating an example typical traffic profile of a particular datacenter environment, in some examples.

FIG. 3 is a diagram illustrating an example typical traffic profile 300 of a particular datacenter environment, in some examples. Referring to FIGS. 1-3, the typical traffic profile 300 is determined based on I/O commands (e.g., sequential write commands and operations, random write commands and operations, sequential read commands and operations, random read commands and operations, and so on) received and processed by the SSD 102 from the host 112, and includes an I/O command pattern of those I/O commands. The typical traffic profile 300 visualizes an I/O command pattern of a server (e.g., the host 112) providing virtualized desktop systems to a large number (e.g., hundreds or thousands) of clients, all of which are based in the same time zone and with a strong "nine-to-five" (09:00-17:00) type of workload. The typical traffic profile 300 is provided on a "daily" basis and illustrates the I/O command pattern throughout a typical work day. The pattern may be repeated for each working day (e.g., Monday to Friday), while exhibiting a completely different pattern (including mainly backup activities or inactivity, for example) during weekends and public, state, or Federal holidays for example. For example, the x-axis corresponds to time of day (00:00-24:00), and the y-axis corresponds to IOPS, averaged over a time unit of an hour.

As shown, in a backup phase A (00:00-05:00), the host 112 backs up the data currently on the SSD 102 (e.g., in the non-volatile memory 120) to a secondary backup system (a storage device other than the SSD 102). In the backup phase A, the host 112 issues a large number of sequential read commands and a small random write commands, corresponding to the commensurate numbers of sequential read operations and random write operations, respectively. The data read in the sequential read operations are being stored to the secondary backup system. The data written to the SSD 102 in the random write operations includes metadata to log information related to the backup.

In a system startup phase B (05:00-09:00), the host 112 performs a large number of random read operations, an increasing number of random write operations, and a small number of sequential read operations, by issuing commensurate numbers of random read commands, random write commands, and sequential read commands, respectively.

In a daytime activity phase C, the host 112 performs relatively constant proportions (ratios) of I/O operation types including a large number of random read operations, a significant and lesser number of random write operations, and small numbers of sequential read and write operations, by issuing commensurate numbers of random read commands, random write commands, sequential read commands, and sequential write commands, respectively. Such activities diminishes toward the end of the work day (e.g., at around 18:00), as the clients starts to become inactive.

In an inactivity phase D, the host 112 performs low levels of I/O operations, including small numbers of random read operations, random write operations, sequential read operations, and sequential write operations, by issuing commensurate numbers of random read commands, random write commands, sequential read commands, and sequential write commands, respectively.

Ransomware causes the host 112 to read data stored in the SSD 102 using mostly sequential read operations, unless the files corresponding to the data are very fragmented of unencrypted data. The controller 116 may detect a large number of sequential read operations as a deviation from the typical traffic profile 300, which includes mostly random read and write operations. The ransomware can further cause the host 112 to send a large number of sequential write commands to write encrypted data, immediately after the large number of sequential read operations. The new files being written as a whole in one operation is typically performed with a stream of sequential write operations for sequential logical block address locations.

In some arrangements, the typical traffic profile 300 can include one or more thresholds that can be used to determine whether the commands received from the host 112 deviate from the typical traffic profile 300 (e.g., at 230). The thresholds include an IOPS value threshold for a given type of I/O operations within a time of day period, an IOPS proportion threshold for a given type of I/O operation with respect to all I/O operation within the time of day period, logical address range size value thresholds including average, maximum, and minimum value thresholds, data rate value thresholds including average, maximum, and minimum data rates, data size value thresholds including average, maximum, and minimum data sizes, data entropy value thresholds including average, maximum, and minimum data entropy values. Examples of the time of day period includes the backup phase A, the system startup phase B, the daytime activity phase C, the inactivity phase D, the entire day (00:00-24:00), and so on.

In the typical traffic profile 300, multiple IOPS values can determined for each type of I/O operations within a given time sampling interval, for example, on an hourly basis. For example, nine IOPS values are determined for each of the four types of I/O operations within the daytime activity phase C, one for each time sampling unit (e.g., an hour). In some examples, the IOPS value threshold for a given type of I/O operations (e.g., sequential read operations or sequential write operations) can be the maximum or minimum IOPS value of the IOPS values determined for that type of I/O operations within the time sampling interval. In some examples, the IOPS value threshold for a given type of I/O operations can be the maximum or minimum IOPS value of the IOPS values determined for that type of I/O operations within the time sampling interval, plus a suitable margin. In some examples, the IOPS value threshold for a given type of I/O operations can be an average (mean, median, or mode) IOPS value of the IOPS values determined for that type of I/O operations within the time interval, plus a suitable margin (e.g., multiples of a standard deviation of the IOPS values determined within the time sampling interval).

In the typical traffic profile 300, an IOPS proportion for given type of I/O operations (e.g., sequential read operations or sequential write operations) can be calculated by determining a ratio of the IOPS of that type of I/O operations to the total IOPS of all I/O operations. For example, nine IOPS proportions can be determined for each of the four types of I/O operations within the daytime activity phase C, one for each time sampling unit (e.g., an hour). In some examples, the IOPS proportion threshold for a given type of I/O operations (e.g., sequential read operations or sequential write operations) can be the maximum IOPS proportion of the IOPS proportions determined for that type of I/O operations within the time interval. In some examples, the IOPS proportion threshold for a given type of I/O operations can be the maximum IOPS proportion of the IOPS proportions determined for that type of I/O operations within the time interval, plus a suitable margin. In some examples, the IOPS proportion threshold for a given type of I/O operations can be the minimum IOPS proportion of the IOPS proportions determined for that type of I/O operations within the time interval, plus or minus a suitable margin. In some examples, the IOPS proportion threshold for a given type of I/O operations can be an average (mean, median, or mode) IOPS proportion of the IOPS proportions determined for that type of I/O operations within the time interval, plus a suitable margin (e.g., multiples of a standard deviation of the IOPS proportions determined within the time interval).

In an example implementation of block 230, the commands received from the host at 220 are measured against one or more of the IOPS value threshold, the IOPS proportion threshold, or another suitable threshold of the typical traffic profile 300. In some examples, the time duration in which the commands are received correspond to (e.g., is the same as or is within) the time of day period for which the threshold is determined. For example, the threshold applied to the commands received from the host at 220 during time period 09:00-17:00 or during time period 10:00-11:00 of a given day can be the threshold determined within the time of day period of the daytime activity phase C (09:00-17:00).

The controller 116 (e.g., the protocol interface 140) can determine IOPS value for a type of I/O commands (e.g., sequential read commands or sequential write commands) received during the time duration, and compare the determined IOPS value to the IOPS value threshold of the same type of I/O commands/operations. The IOPS value can be an average IOPS value, a maximum IOPS value, or a minimum IOPS value. In response to determining that the determined IOPS value exceeds the IOPS value threshold, the controller 116 determines that the commands received at 220 deviate from the typical traffic profile 300. On the other hand, in response to determining that the determined IOPS value does not exceed the IOPS value threshold, the controller 116 determines that the commands received at 220 do not deviate from the typical traffic profile 300.

Likewise, the controller 116 (e.g., the protocol interface 140) can determine IOPS proportion for a type of I/O commands (e.g., sequential read commands or sequential write commands) received during the time duration, and compare the determined IOPS proportion to the IOPS proportion threshold of the same type of I/O commands/operations. In response to determining that the determined IOPS proportion exceeds the IOPS proportion threshold, the controller 116 determines that the commands received at 220 deviate from the typical traffic profile 300. On the other hand, in response to determining that the determined IOPS proportion does not exceed the IOPS proportion threshold, the controller 116 determines that the commands received at 220 do not deviate from the typical traffic profile 300.

In some examples, the controller 116 determines that the commands received at 220 deviate from the typical traffic profile 300 in response to determining that (1) the IOPS value (determined for sequential read commands received in a first time duration) exceeds the IOPS value threshold for sequential read commands, or the IOPS proportion (determined for the sequential read commands received in the first time duration) exceeds the IOPS proportion threshold for sequential read commands; and (2) the IOPS value (determined for sequential write commands received in a second time duration) exceeds the IOPS value threshold for sequential write commands, or the IOPS proportion (determined for the sequential write commands received in the second time duration) exceeds the IOPS proportion threshold for sequential write commands. In some examples, the second time duration immediately follows the first time duration. In other examples, the second time duration occurs within a predetermined time period (e.g., 30 seconds, one minute, five minutes, 30 minutes, one hour, and so on) after the end of the first time duration.

In some examples, the controller 116 determines that the commands received at 220 deviate from the typical traffic profile 300 in response to determining that (1) the size of logical address ranges (determined for trim/unmap/deallocate commands received in a first time duration) exceeds the logical address range size value threshold for trim/unmap/deallocate commands, or the IOPS value (determined for trim/unmap/deallocate commands received in a first time duration) exceeds the IOPS value threshold for trim/unmap/deallocate commands, or the IOPS proportion (determined for the trim/unmap/deallocate commands received in the first time duration) exceeds the IOPS proportion threshold for trim/unmap/deallocate commands; and/or (2) the size of logical address ranges (determined for trim/unmap/deallocate commands received in a second time duration) exceeds the logical address range value threshold for trim/unmap/deallocate commands, or the IOPS value (determined for trim/unmap/deallocate commands received in a second time duration) exceeds the IOPS value threshold for trim/unmap/deallocate commands, or the IOPS proportion (determined for the trim/unmap/deallocate commands received in the second time duration) exceeds the IOPS proportion threshold for sequential read commands. In some examples, the second time duration immediately follows the first time duration. In other examples, the second time duration occurs within a predetermined time period (e.g., 30 seconds, one minute, five minutes, 30 minutes, one hour, and so on) after the end of the first time duration.

Figure 4:
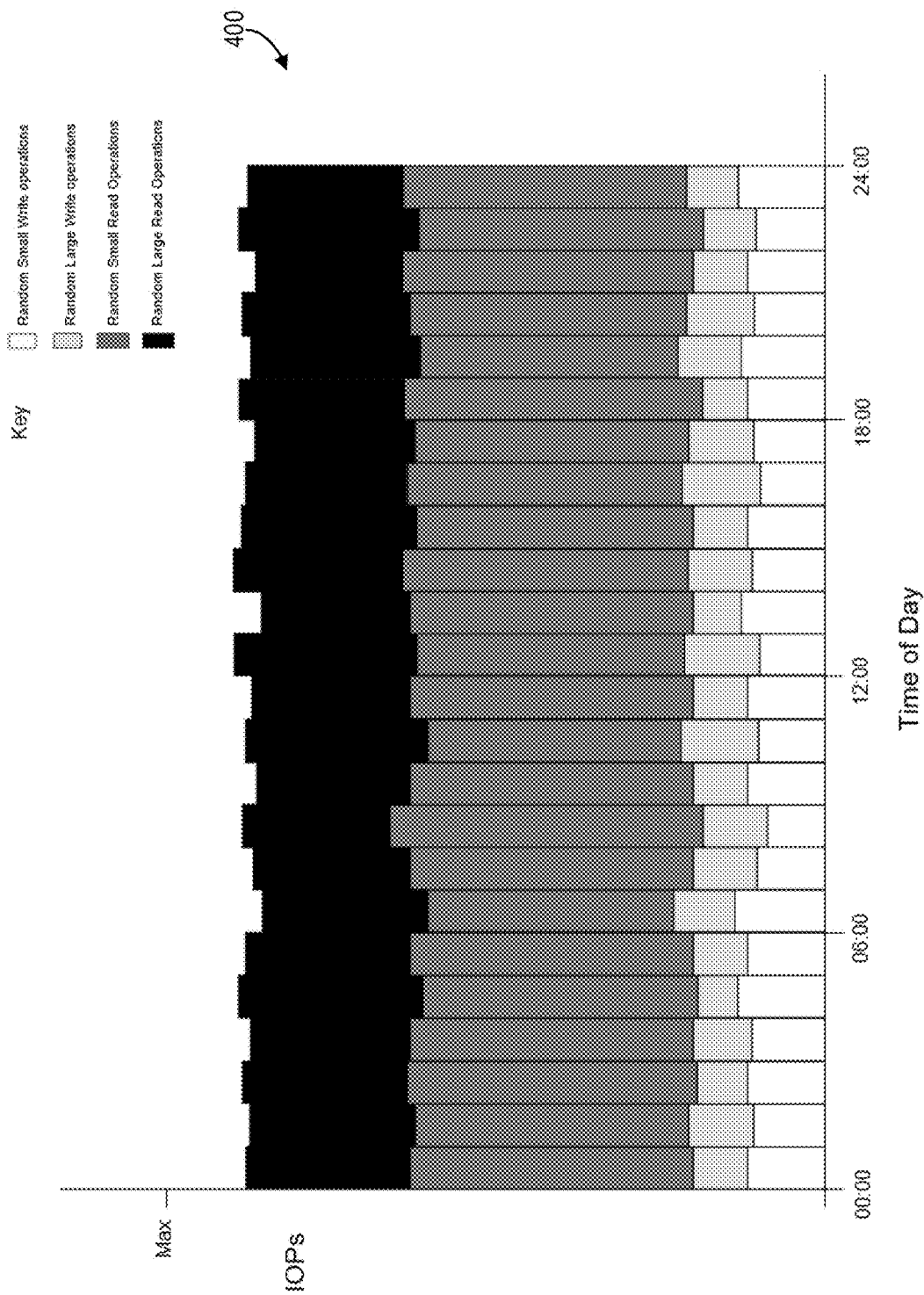
FIG. 4 is a diagram illustrating an example typical traffic profile of a particular datacenter environment, in some examples.

FIG. 4 is a diagram illustrating an example typical traffic profile 400 of a particular datacenter environment, in some examples. Referring to FIGS. 1-4, the typical traffic profile 400 is determined based on I/O commands and data sizes associated thereof (e.g., random small write commands and operations, random small write commands and operations, random large read commands and operations, random small read commands and operations, and so on) received and processed by the SSD 102 from the host 112, and includes an I/O command pattern of those I/O commands. The typical traffic profile 400 visualizes an I/O command pattern of a server (e.g., the host 112) of a social media type application which provides access to data for global clients (in different time zones), where such data is written once (in random small write operations) but read many times (in random small read operations). The typical traffic profile 400 is provided on a "daily" basis and illustrates the I/O command pattern (taking into account associated data sizes) throughout a typical day. For example, the x-axis corresponds to time of day (00:00-24:00), and the y-axis corresponds to IOPS, averaged over a time unit of an hour.

As used herein, a large read operation/command or a large write operation/command corresponds to data having a data size that is greater than a 1 or 4 MB threshold for example.

As used herein, a small read operation or a small write operation corresponds to data having a data size that is less than a 4 or 16 KB threshold for example As shown, the total IOPS (the sum of IOPS for all four types of operations) and therefore the total number of operations (including all four types of operations) determined on an hourly basis remain relatively constant throughout the entire day. Further, the proportions or ratios of the different types of operations determined on an hourly basis also remain relatively constant throughout the entire day, maintaining consistent ratios of the different ones of the random small write operations, random small write operations, random large read operations, and random small read operation. In general, the typical traffic profile 400 is shown to include only random read and write operations, where the number of all write operations corresponds to a smaller percentage than the number of all read operations.

The I/O activities caused by ransomware most likely includes large unit data transfers or large logical block address ranges. Examples of the large unit data transfers or large logical block address ranges include but are not limited to, I/O operations involving large data sizes or logical block address range sizes (such as large read operations, which may be sequential or random, depending on the degree of fragmentation of the files in question), large sequential write operations (since new files written will most likely occupy sequential logical block addresses), or trim/unmap/deallocate operations with large logical block address ranges specified (which attempt to cause large regions of logical blocks containing original user data to be erased by garbage collection). This is because the objective of the ransomware is to read, encrypt and write data files or erase data files as quickly as possible. Therefore, using I/O commands with large data units (e.g., large read commands, large write commands or large trim/unmap/deallocate commands) is most efficient. In the example in which the controller 116 typically experiences mainly small unit data transfers (e.g., small read operations, small write operations or small trim/unmap/deallocate operations) from the host 112 in the typical traffic profile 400 may identify a large number of large read commands, large write commands or large trim/unmap/deallocate commands to deviate from the typical traffic profile 400.

In some arrangements, the typical traffic profile 400 can include one or more thresholds that can be used to determine whether the commands received from the host 112 deviate from the typical traffic profile 400 (e.g., at 230). The thresholds include an IOPS value threshold for a given type of I/O operations within a time of day interval, an IOPS proportion threshold for a given type of I/O operation with respect to all I/O operation within the time of day interval. The IOPS value threshold and the IOPS proportion threshold can be determined in the manner similar to described with respect to the typical traffic profile 300. Examples of the time of day interval includes the entire day (00:00-24:00), early morning (06:00-08:00) and so on. In some examples, the IOPS value threshold for any type of sequential write or read operations in the typical traffic profile 400 may be 0 or a very low number (e.g., 1 or less than 1 IOPS). In some examples, or the IOPS proportion threshold for any type of sequential write or read operations in the typical traffic profile 400 may be 0 or a very low number (e.g., 0.00001 or less).

The controller 116 (e.g., the protocol interface 140) can determine IOPS value for a type of I/O commands (e.g., read commands corresponding to large data sizes, write commands corresponding to large data sizes or trim/unmap/deallocate commands corresponding to large data sizes specified by large logical block address ranges) received during the time duration, and compare the determined IOPS value to the IOPS value threshold of the same type of I/O commands/operations. In response to determining that the determined IOPS value exceeds the IOPS value threshold, the controller 116 determines that the commands received at 220 deviate from the typical traffic profile 400. On the other hand, in response to determining that the determined IOPS value does not exceed the IOPS value threshold, the controller 116 determines that the commands received at 220 do not deviate from the typical traffic profile 400.

Likewise, the controller 116 (e.g., the protocol interface 140) can determine IOPS proportion for a type of I/O commands (e.g., read commands corresponding to large data sizes, write commands corresponding to large data sizes or trim/unmap/deallocate commands corresponding to large data sizes specified by large logical block address ranges) received during the time duration, and compare the determined IOPS proportion to the IOPS proportion threshold of the same type of I/O commands/operations. In response to determining that the determined IOPS proportion exceeds the IOPS proportion threshold, the controller 116 determines that the commands received at 220 deviate from the typical traffic profile 400. On the other hand, in response to determining that the determined IOPS proportion does not exceed the IOPS proportion threshold, the controller 116 determines that the commands received at 220 do not deviate from the typical traffic profile 400.

The read commands corresponding to large data sizes include random large read commands and/or sequential large read commands. The write commands corresponding to large data sizes include random large write commands and/or sequential large write commands. The trim/unmap/deallocate commands corresponding to large data sizes include random large trim/unmap/deallocate commands and/or sequential large trim/unmap/deallocate commands.

Figure 5:
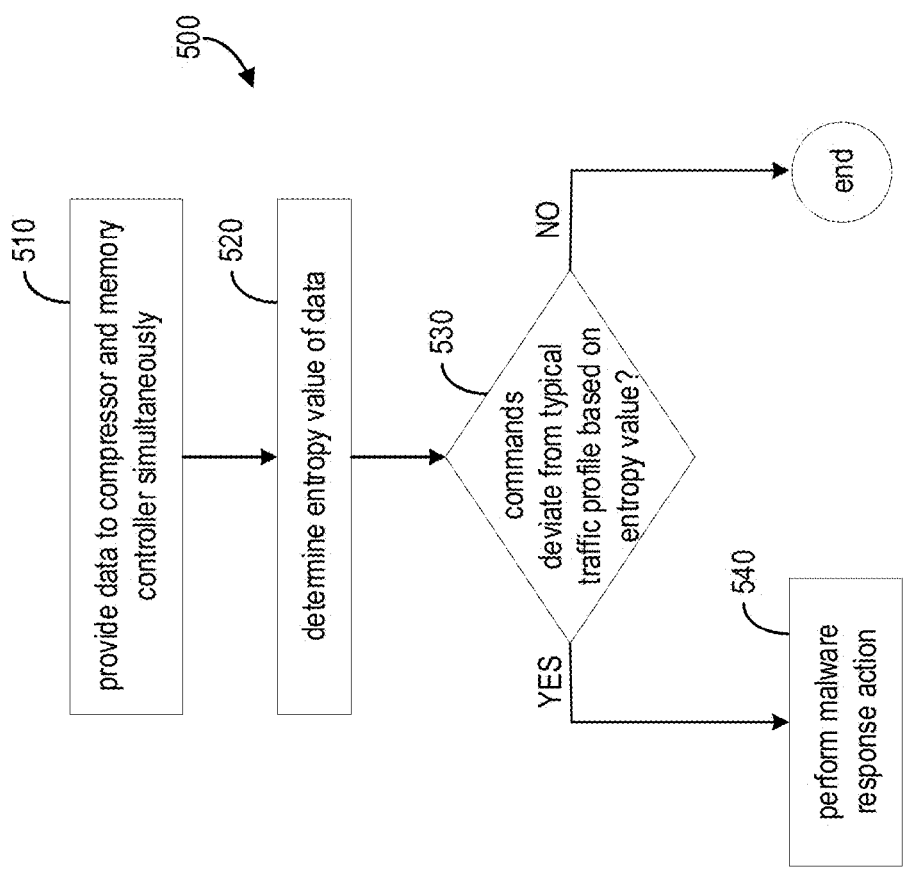
FIG. 5 is a flow diagram illustrating an example process for detecting encrypted data associated with write commands, according to some implementations.

FIG. 5 is a flow diagram illustrating an example process 500 for detecting encrypted data associated with write commands, according to some implementations. Referring to FIGS. 1-5, the process 500 is performed by the controller 116. An example implementation of block 230 includes blocks 510-530. An example implementation of block 240 includes block 540. The process 500 relates to detecting encrypted data and determining whether the presence of encrypted data deviates from the typical traffic profile. In some examples, the controller 116 begins detecting whether the data received from the host 112 is encrypted (e.g., begins performing the process 500) in response to determining that the commands deviate from the typical traffic profile by other methods (e.g., those described with reference to the typical traffic profiles 300 and 400). In alternative examples, the controller 116 continuously performs the detection (e.g., continuously performing the process 500), which does not impact the I/O performance of the SSD 102 in handling I/O operations for the same data. In other words, the controller 116 can simultaneously (1) detect the transfer of encrypted data (by performing real-time compression the data to determine an estimate of the entropy or randomness of the data) using the encryption detector 150 and the compressor 152 and (2) process the commands associated with the data using the memory controller 130.

At 510, data is provided to the compressor 152 and the memory controller 130 simultaneously. For example, the host interface 114 receives data associated with write commands from the host 112 and provides the data and the commands to the protocol interface 140. The protocol interface 140 provides the data to the memory controller 130 via the data path through the encryption detector 150 and buffer memory 126 directed by data path control 124 of the FTL 122, for the write operation. In other words, the same data is provided to both the memory controller 130 and the encryption detector 150. In some implementations, the encryption detector 150 may first provide the data to the buffer memory 126 (and thence to the memory controller 130) and subsequently use the data in the buffer memory 126 for analysis by the compressor 152, to avoid any additional delay to data in the main data path to the memory controller 130.

At 520, the compressor 152 determines an entropy value of the data by attempting to compress the data. The encryption detector 150 provides the data to the compressor 152, and the compressor 152 determines the entropy value of the received data. Data (e.g., data corresponding to a text file or document) that has a low entropy value is considered to be ordered. Data that appears entirely random can be data encrypted with a cryptographically strong encryption algorithm (e.g., AES), and is incompressible by the compressor 152. The compressor 152 can return the entropy value to the encryption detector 150. The encryption detector 150 may additionally employ the discriminator which can distinguish between data with a high entropy value and has been compressed and data with a high entropy value and has been encrypted.

At 530, the encryption detector 150 determines whether the commands deviate from the typical traffic profile based on the entropy value. Block 530 includes one or more of determining the entropy value of the data, generating histogram statistics of byte values of the data, and evaluating the data against the typical traffic profile.

In some arrangements, the encryption detector 150 evaluates the entropy value of the data against entropy threshold. In response to determining that the entropy value is below the entropy threshold, the encryption detector 150 determines that the data is most likely not encrypted data, and the commands corresponding to the data do not deviate from a typical traffic profile in which encrypted data is rare or non-existent (530: NO), and the process 500 ends. In some arrangements, the encryption detector 150 may maintain an average and maximum/minimum range of entropy values for the data associated with write commands received from the host 112 and determine if these values deviate from the average or expected range of entropy values in the typical traffic profile.

In response to determining that the entropy value exceeds the entropy threshold, the encryption detector 150 can further check whether bit and byte values of the histograms of the data are evenly (randomly) distributed by generating histogram statistics of byte values of the data, to distinguish encrypted data from media files such as but not limited to, compressed sound (e.g., MP3), compressed images (e.g., JPG), and compressed videos (e.g., MP4) as well as from compressed archives such as but not limited to, ZIP files. In response to determining that the bit and byte values of the histograms of the data are evenly (randomly) distributed, the encryption detector 150 determines that the data is most likely not encrypted data, and the commands corresponding to the data do not deviate from a typical traffic profile in which encrypted data is rare or non-existent (530: NO), and the process 500 ends. On the other hand, in response to determining that the bit and byte values of the histograms of the data are not evenly (randomly) distributed, the encryption detector 150 determines that the data is most likely encrypted data. The encryption detector 150 may also perform Chi-squared distribution and Monte Carlo pi approximation tests to distinguish between compressed and encrypted data.

Upon the determination that the data is most likely encrypted data, the encryption detector 150 evaluates the presence of the encrypted based a typical traffic profile. In the examples in which the typical traffic profile is devoid of any write operations for encrypted data at any time, the mere presence of the encrypted data indicates that the write command corresponding to the encrypted data deviates from the typical traffic profile (530: YES). In the examples in which the typical traffic profile indicates a IOPS value threshold or an IOPS proportion threshold, the encryption detector 150 determines an IOPS value or an IOPS proportion for the write commands corresponding to the encrypted data. In response to determining that the determined IOPS value or IOPS proportion exceeds the IOPS value threshold or the IOPS proportion threshold, respectively, the commands corresponding to the encrypted data deviates from the typical traffic profile (530: YES). On the other hand, in response to determining that the determined IOPS value or IOPS proportion do not exceed the IOPS value threshold or the IOPS proportion threshold, respectively, the commands corresponding to the encrypted data do not deviate from the typical traffic profile (530: NO).

In response to determining that the commands deviate from the typical traffic profile (530: YES), the controller 116 performs one or more malware response actions, at 540. The malware response action includes one or more of stopping processing trim, unmap, deallocate commands received from the host 112, stopping processing write commands received from the host 112, causing the SSD 102 (e.g., the controller 116) to not respond to any commands from the host 112, stopping all write operations, or stopping any garbage collection.

Given that malware typically causes immediate trim, unmap, or deallocate commands for data to be sent to the SSD 102 following the writing commands for a similar amount of encrypted data, the encryption detector 150 can send a Trim Block signal to the command parser 142, where the Trim Block signal instructs the command parser 142 to stop or refrain from processing of trim, unmap, or deallocate commands received from the host 112.

The encryption detector 150 can also send a Write Block signal to the command parser 142, where the Write Block signal instructs the command parser 142 to stop or refrain from processing write commands received from the host 112, thus preventing further writing of encrypted data by the suspected ransomware.

Furthermore, the encryption detector 150 can cause the SSD 102 (e.g., the controller 116) to go offline and/or refrain from responding to any commands receive from the host 112. The encryption detector 150 can indicate to the FTL 122 that all writes to the non-volatile memory 120 should stop and/or that garbage collection is not to be performed, thus preserving the state of the data in the non-volatile memory 120. In some arrangements, the encryption detector 150 can send a Delay Garbage Collection signal or Suspend Garbage Collection signal to the FTL 122 in order to prevent the erasure of original user data which may have been encrypted by the malware.

This can assist with the recovery of data if the SSD 102 is removed and connected to a cleanroom system designed to recover all data from the SSD 102.

While particular example processes described herein relate to determining parameters such as IOPS, data sizes, and data content types of incoming data and evaluating such parameters using a typical traffic profile, a single determination of whether the commands associated with the incoming data deviate from the typical traffic profile can be made based on any or all parameters and one or multiple different typical traffic profiles. Different typical traffic profiles and different parameters can be weighted differently.

Furthermore, machine learning and AI can be deployed in the SSD firmware to learn typical filesystem I/O commands, data sizes, and data content types, to build a learned model representative of the typical traffic profile. In other words, the controller 116 can implement machine learning to determine a model representative of a typical traffic profile (e.g., the typical traffic profiles 300 and 400). Based on the learned model, the AI can identify any unusual filesystem I/O commands, data sizes, and/or data content types that deviate from the learned model, and trigger the performance of the malware response action at 240 and/or 540. Therefore, atypical activities can be recognized by the controller 116 by first identifying and learning the typical traffic profile through monitoring filesystem I/O commands, data sizes, and data content types, and then identifying particular I/O "signature" of the ransomware as deviating from the typical traffic profile.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for protecting data stored on a Solid State Drive (SSD) against malware, comprising:
    determining, by a controller of the SSD, a typical traffic profile;
    receiving, by the controller, commands from a host, wherein the commands include at least one of a command to read data from the SSD to the host or a command to write data from the host to the SSD;
    parsing, by the controller, one or more of a logical address range, a data transfer type and a data content type from the commands received by the controller from the host,
    determining, by the controller, that the commands are likely caused by malware by determining that the commands deviate from the typical traffic profile based on the parsing; and
    in response to determining the commands are likely caused by the malware, perform, by the controller, a malware response action.

2. The method of claim 1, wherein the malware response action comprises one or more of delaying execution of the commands, stopping the execution of the commands, ignoring the commands, or reporting to the host that the commands are likely caused by the malware.

3. The method of claim 1, wherein the typical traffic profile is determined based on one or more of input/output (I/O) command pattern, logical block address range sizes, data transfer types, rates or sizes of data received from the host, or data content types of the data received from the host.

4. The method of claim 1, wherein the typical traffic profile is determined based on input/output (I/O) operations per second (IOPS) for one or more of sequential write operations, random write operations, sequential read operations, random read operations, trim operations, unmap operations, or deallocate operations.

5. The method of claim 4, wherein
    the commands received from the host comprises sequential read commands, sequential write commands, trim operations, unmap operations or deallocate operations; and
    the sequential read commands, the sequential write commands, the trim operations, the unmap operations or the deallocate operations are determined to deviate from the typical traffic profile based on the IOPS for the one or more of the sequential write operations, the random write operations, the sequential read operations, the random read operations, the trim operations, the unmap operations or the deallocate operations.

6. The method of claim 1, wherein the typical traffic profile is determined based on input/output (I/O) operations per second (IOPS) for one or more of small write operations, large write operations, small read operations, large read operations, trim operations, unmap operations, or deallocate operations.

7. The method of claim 6, wherein
    the commands received from the host comprises read commands corresponding to large data sizes or write commands corresponding to large data sizes; and
    the read commands corresponding to large data sizes or the write commands corresponding to large data sizes are determined to deviate from the typical traffic profile based on the IOPS for the one or more of the small write operations, the large write operations, the small read operations, or the large read operations.

8. The method of claim 1, wherein the commands are write commands; and
    determining that the commands are likely caused by the malware comprises determining, by the controller, that data associated with the write commands is encrypted data.

9. The method of claim 8, wherein determining that the data associated with the write commands is the encrypted data comprises:
    compressing, by a compressor of the controller, the data associated with the write commands; and
    determining, by the compressor, that the data is incompressible.

10. The method of claim 9, wherein
    compressing the data comprises determining an entropy value for the data; and
    the data associated with the write commands is determined to be encrypted data based on the entropy value and an encrypted data threshold.

11. The method of claim 8, wherein the malware response action comprises one or more of:
    stopping processing trim, unmap, deallocate commands received from the host;
    stopping processing write commands received from the host;
    causing the SSD to not respond to any commands from the host;
    stopping all write operations; or
    stopping any garbage collection operations.

12. The method of claim 8, further comprising simultaneously providing the data to a memory controller and a compressor.

13. A Solid State Drive (SSD), comprising:
    a controller; and
    a non-volatile memory, wherein the controller is configured to:
        determine a typical traffic profile;
        receive commands from a host, wherein the commands include at least one of a command to read data from the SSD to the host or a command to write data from the host to the SSD;
        parse one or more of a logical address range, a data transfer type and a data content type from the commands received by the controller from the host, determine that the commands are likely caused by malware by determining that the commands deviate from the typical traffic profile based on the parsing; and in response to determining the commands are likely caused by the malware, performing a malware response action.

14. The SSD of claim 13, wherein
the commands are write commands; and
the controller determines that the commands are likely caused by the malware by determining that data associated with the write commands is encrypted data.

15. The SSD of claim 14, wherein
the controller comprises a compressor; and
the controller determines that the data associated with the write commands is the encrypted data by:
  compressing, by the compressor, the data associated with the write commands; and
  determining, by the compressor, that the data is incompressible.

16. The SSD of claim 15, wherein
compressing the data comprises determining an entropy value for the data; and
the data associated with the write commands is determined to be encrypted data based on the entropy value and an encrypted data threshold.

17. The SSD of claim 14, wherein the malware response action comprises one or more of:
  stopping processing trim, unmap, deallocate commands received from the host;
  stopping processing write commands received from the host;
  causing the SSD to not respond to any commands from the host;
  stopping all write operations; or
  stopping any garbage collection operations.

18. The SSD of claim 14, wherein
the controller comprises a compressor and a memory controller; and
the data is simultaneously provided to the compressor and the memory controller.

19. The SSD of claim 13, wherein the typical traffic profile is determined based on one or more of input/output (I/O) command pattern, data sizes of data received from the host, or data content types of the data received from the host.

20. A non-transitory computer-readable medium storing computer-readable instructions, such that when executed, causes a controller of a Solid State Drive (SSD) to:
  determine a typical traffic profile;
  receive commands from a host, wherein the commands include at least one of a command to read data from the SSD to the host or a command to write data from the host to the SSD;
  parse one or more of a logical address range, a data transfer type and a data content type from the commands received by the controller from the host,
  determine that the commands are likely caused by malware by determining that the commands deviate from the typical traffic profile based on the parsing; and
  in response to determining the commands are likely caused by the malware, performing a malware response action.

* * * * *